UNITED STATES PATENT OFFICE.

CARL HOFFMANN, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

ACIDYL DIALKYLRHODAMIN AND PROCESS OF MAKING SAME.

SPECIFICATION forming part of Letters Patent No. 694,149, dated February 25, 1902.

Application filed December 10, 1901. Serial No. 85,309. (Specimens.)

*To all whom it may concern:*

Be it known that I, CARL HOFFMANN, Ph. D., a citizen of the Empire of Austria-Hungary, residing at Höchst-on-the-Main, in the Empire of Germany, have invented certain new and useful Improvements in the Manufacture of Rhodamin Derivatives, of which the following is a specification.

I have found that acidyl derivatives of meta-amidophenol, such as acetyl-meta-amidophenol (meta-oxyacetanilid) or benzoyl-meta-amidophenol, (meta-oxybenzanilid,) may be condensed with dialkylamidoöxybenzoylbenzoic acid and that acidulated asymmetric dialkylrhodamins are thus obtained. These dyestuffs are substances of metallic luster, and when pulverized dark-red powders soluble with difficulty in water and dilute mineral acids and insoluble in ether, but readily dissolved by hot alcohol, the solutions having an eosin or pink-red color and fluorescence. They dye mordanted calico bright yellow-red to bluish-red shades. By separating the acid radical from the new dyestuffs the asymmetric dialkylrhodamins are obtained. As condensation agent it is best to use concentrated sulfuric acid. The following example illustrates the process:

Example: Four parts, by weight, of diethylamidoöxybenzoylbenzoic acid are dissolved in forty parts of concentrated sulfuric acid of 66° Baumé specific gravity. To this mixture are added at 20° to 30° centigrade, while stirring, two parts of meta-oxyacetanilid. When all has dissolved, the whole is allowed to stand for four to five hours. The mixture is at first yellow, but soon becomes dark and then brown red, having finally a distinct fluorescence. The mixture is then poured on ice while stirring, and the product of condensation separates as a crystalline mass. Washed with water and dried the product is a dark-red powder soluble with difficulty in water and dilute mineral acid, insoluble in ether. It is, however, easily dissolved by hot alcohol. The dilute alcoholic solution is pink red and has a green-yellow fluorescence. When heated with dilute mineral acid, it is transformed into asymmetric dialkylrhodamin.

The procedure is similar when other acidyl-meta-amidophenols and other dialkylamidooxybenzoylbenzoic acids are used. The corresponding products are analogous to the compounds having the general properties already described above.

Having now described my invention, what I claim is—

1. The herein-described process for the manufacture of acidulated asymmetric dialkylrhodamins which consists in condensing dialkylamidoöxybenzoylbenzoic acids with acidyl-meta-amidophenols, substantially as set forth.

2. As new products, the acidulated asymmetric dialkylrhodamins, being substances of metallic luster and when pulverized red powders, soluble with difficulty in water and dilute cold acid, insoluble in ether, but readily dissolved by hot alcohol, the alcoholic solutions are pink red and dye mordanted calico bright yellow-red to bluish-red shades; said products when heated with dilute mineral acid are easily transformed into the asymmetric dialkylrhodamins.

3. The herein-described process for the manufacture of acidulated dialkylrhodamins, which consists in condensing diethylamidooxybenzoylbenzoic acid with meta-oxyacetanilid, substantially as set forth.

4. As a new product, the acidulated asymmetric diethylrhodamin, being in a dry state a dark-red powder, soluble with difficulty in water and dilute acid, insoluble in ether, but readily dissolved by hot alcohol, the dilute alcoholic solution is pink red and has a green-yellow fluoresence; it dyes mordanted calico bright yellow-red shades and when heated with dilute mineral acid is readily transformed into asymmetric diethylrhodamin.

In testimony that I claim the foregoing as my invention I have signed my name in presence of two subscribing witnesses.

CARL HOFFMANN.

Witnesses:
ALFRED BRISBOIS,
JOHANN HARTENSTEIN.